Oct. 12, 1965 N. W. LEWIS 3,211,246
AIR CUSHION VEHICLE
Filed Aug. 8, 1962 2 Sheets-Sheet 1
FIG. 1
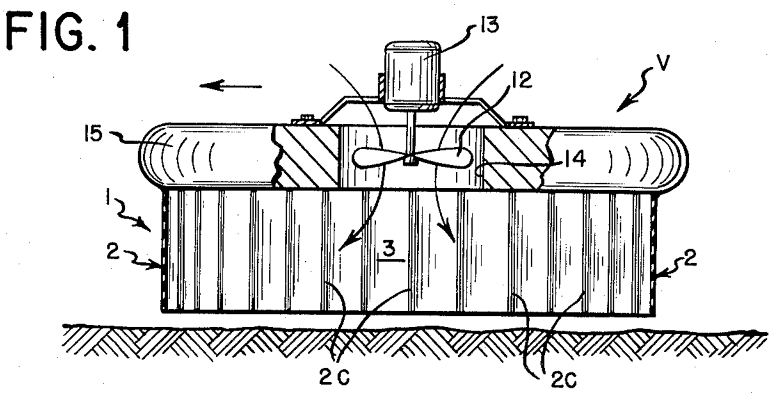
FIG. 2
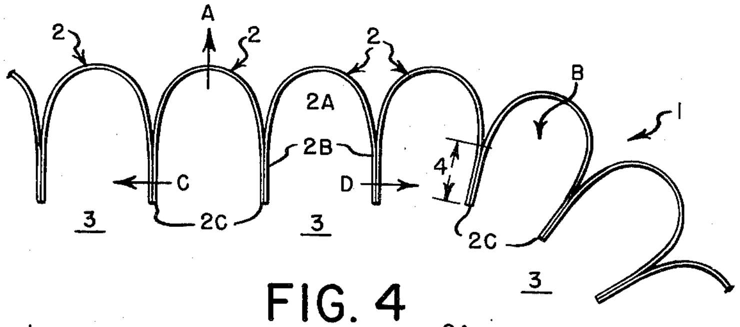
FIG. 3
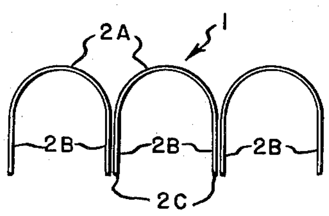
FIG. 4
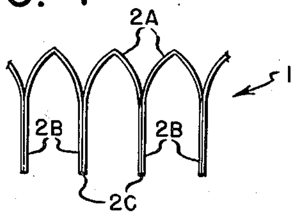
FIG. 5
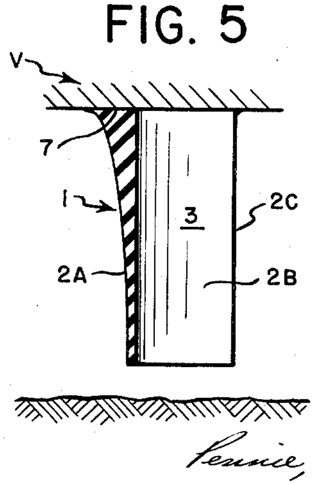
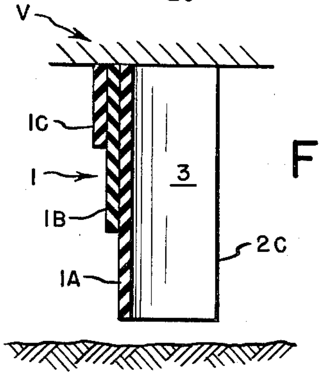
FIG. 6
INVENTOR
Nigel Wickham Lewis
BY
Pennie, Edmonds, Morton, Taylor & Adams
ATTORNEYS Oct. 12, 1965 N. W. LEWIS 3,211,246

AIR CUSHION VEHICLE

Filed Aug. 8, 1962 2 Sheets-Sheet 2

INVENTOR
Nigel Wickham Lewis
BY
Pennie, Edmonds, Morton, Taylor & Adams
ATTORNEYS

United States Patent Office 3,211,246
Patented Oct. 12, 1965

3,211,246
AIR CUSHION VEHICLE
Nigel Wickham Lewis, Gerrards Cross, England, assignor to Vickers-Armstrongs (Engineers) Limited, London, England, a British company Filed Aug. 8, 1962, Ser. No. 215,713
Claims priority, application Great Britain, Sept. 13, 1961, 32,919/61; Dec. 22, 1961, 46,082/61
12 Claims. (Cl. 180—7)

This invention relates to vehicles.

According to the present invention there is provided a vehicle adapted to be supported on an air cushion produced by supplying air through an opening or openings on the underside of the vehicle, the vehicle having on its underside a flexible skirt extending downwardly from the peripheral part of the vehicle body for encircling the air cushion, the skirt being of corrugated form in plan view, the outermost parts of the skirt being relatively resistant to buckling so far as compressive forces on these parts are concerned whilst the innermost parts of the skirt are relatively prone to buckling so far as compressive forces on these parts in the up and down direction are concerned.

For a better understanding of the invention and to show how the same may be carried into effect reference will now be made, by way of example, to the accompanying drawings in which:

FIG. 1 is a diagrammatic elevational view partly broken away and partly in section showing an air cushion borne vehicle according to the invention and in which one form of corrugated skirt construction is illustrated diagrammatically;

FIG. 2 is a diagrammatic plan view of a part of a corrugated skirt construction of the type shown in FIG. 1, for encircling the air cushion of an air cushion borne vehicle;

FIG. 3 is a view similar to that of FIG. 2 showing a modified form of skirt construction relative to that shown in FIG. 2;

FIG. 4 is a view similar to that of FIGS. 2 and 3 showing a further alternative shape for the skirt corrugations shown in FIGS. 2 and 3;

FIGS. 5 and 6 are broken vertical sectional views through modified forms of skirt structures relative to those shown in FIGS. 2, 3 and 4;

Figure 7:
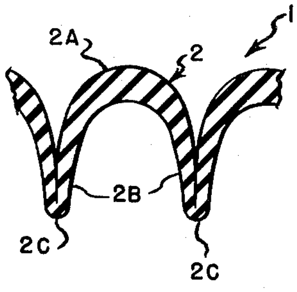
FIG. 7 is a broken horizontal sectional view through an alternative form of skirt structure.

The vehicles to which the various forms of skirt shown in the drawings may be fitted are each of the kind that is adapted to ride on an air cushion produced by air forced from openings at the underside of the vehicle, the cushion being encircled by a skirt extending downwardly from the peripheral part of the underside of the vehicle and completely encircling the cushion. The skirts which are flexible can be fitted either to any of the air cushion borne vehicles known under the Registered Trade Mark "Hovercraft," or to air cushion borne vehicles employing a "plenum" chamber. In plenum chamber vehicles air is fed into the central part of the cushion and flows beneath the bottom edge of the skirt and escapes from the cushion to atmosphere. On "Hovercraft" vehicles, which produce an air cushion around the cushion by means of a downwardly directed jet extending around the whole of the periphery of the underside of the vehicle, two of the flexible skirts may be used one surrounding the other, the former one constituting a downward extension of the outer periphery of the jet and the latter one forming a downward extension of the inner periphery of the jet. The two skirts may, or may not, be of equal length.

Vehicles of the above type are illustrated in FIG. 1 in which the vehicle V is intended to travel in the direction of the arrow thereabove and is adapted to ride on an air cushion 3 produced by air forced for example by an impelled 12 driven by a motor 13 thorugh an opening 14 in the vehicle body 15. The air delivered by the impeller 12 through the opening 14 provides the necessary pressure for the air cushion 3. One or more openings at the underside of the vehicle body may be used.

As illustrated in FIG. 1 the air cushion 3 is encircled by a flexible skirt 1 extending downwardly from the peripheral part of the vehicle body 15 and completely encircling the air cushion 3. The skirt 1 may be of any of a number of structural forms as shown in FIGS. 2 to 13 and described hereinafter. In each case, the skirt 1 is, in plan view, of corrugated form, and these corrugations may or may not be vertical in the normal operating condition of the vehicle. Thus it may be advantageous for the corrugations to extend slightly rearwardly and downwardly. Furthermore, the outer surfaces of the skirt corrugations may extend outwardly and downwardly or inwardly and downwardly. Where the outer surface extends outwardly and downwardly, it is desirable that an inwardly directed lip be provided at the bottom edge of the skirt to impede escape of air from the air cushion.

The cushion 3 may in modified forms (not shown) be supplied with air from a downwardly directed nozzle or nozzles extending around the peripheral part of the underside of the vehicle body 15 to form an air curtain the upper part of which is enclosed between an inner corrugated skirt 1 surrounded by an outer corrugated skirt 1, these skirts forming continuations of the nozzle outlet or outlets.

The cushion encircling skirt 1 of FIG. 2 is formed from a strip of flexible material such as rubber, the strip being of constant thickness and folded to form a plurality of corrugations 2. The upper edge of the strip is secured around the whole peripheral extent of the underside of the vehicle V as illustrated diagrammatically in FIG. 1. Each corrugation 2 has an outer arcuate part 2A which is concave towards the cushion 3, and two webs 2B which extend one from each side of the associated part 2A, into the cushion 3. Adjacent webs 2B of adjacent corrugations 2 are secured together over the whole of the height of the skirt 1 at least at the upright inner edges 2C of the webs 2B. If desired adjacent webs 2B may be secured together along the top of the skirt 1, and for some or all of the whole height of the skirt, over the width or distance 4. The skirt 1 is designed to have sufficient strength and stiffness to withstand the normal pressure of the cushion 3 of the vehicle without buckling. However, an appreciable increase of cushion pressure, or a local load acting outwardly on the bottom part of the skirt 1, say, in the direction of the arrow A, causes the skirt to buckle and collapse so that the lower edge of the skirt easily swings outwardly. Buckling and collapse of the skirt 1 occurs at outward deflections of the skirt amounting to about 10 percent of the height of the skirt and is due to the instability in compression of the arcuate part 2A of each corrugation 2. An inwardly directed force on the bottom part of the skirt 1, say, in the direction of the arrow B (FIG. 2), easily collapses the skirt, the lower edge of the skirt swinging inwardly, since the unsupported upright inner edges 2C of the webs 2B are very unstable so far as compressive forces acting inwardly thereon are concerned. It will readily be understood that the skirt 1 offers little resistance to forces acting on the bottom part of the skirt 1 in the direction either of the arrow C or D. Thus, when the cushion 3 is maintained at its normal designed cushion pressure, the skirt 1 offers little resistance to obstacles encountered.

It will be understood that because of the outwardly acting forces on the skirt 1 due to the air cushion 3 and which forces act continuously on the skirt when the vehicle is in operation, the skirt 1 per se requires a greater resistance to skirt deflecting forces acting outwardly than to forces acting in other directions. This is achieved by so shaping the skirt 1 that the outer parts thereof are relatively resistant to buckling so far as vertical compressive forces on these parts are concerned while the inner skirt parts are relatively prone to buckling so far as vertical compressive forces are concerned.

In FIG. 3 the parts 2A are semi-circular in plan view and the webs 2B of the individual corrugations are not joined to webs 2B of adjacent corrugations. This construction is useful in particular cases where the outer surface of the skirt 1 extends inwardly and downwardly. In FIG. 4 the parts 2A differ from those in FIGS. 2 and 3 in that they are of pointed arch form.

FIG. 5 shows a modified form of the skirt 1 in which the thickness decreases with increasing distance from the root 7 of the skirt. FIG. 6 shows a modified form in which the skirt 1 is laminated and is composed of three strips 1A, 1B and 1C of equal thickness and different heights, with the strip 1B sandwiched between the other two and the upper edges of all three strips 1A, 1B and 1C secured to the underside of the vehicle V. Thus the laminated skirt 1 of FIG. 6 has a thick top portion, an intermediate portion of medium thickness and a thin bottom portion.

Besides varying the thickness of the skirt 1 with the height thereof, the thickness can also be varied horizontally within each corrugation 2. In FIG. 7 each corrugation 2 is thickest at the centre of its arcuate part 2A, the corrugation decreasing in thickness gradually on either side of said centre to a smallest thickness at the upright inner edges 2C of the webs 2B.

Figure 8:
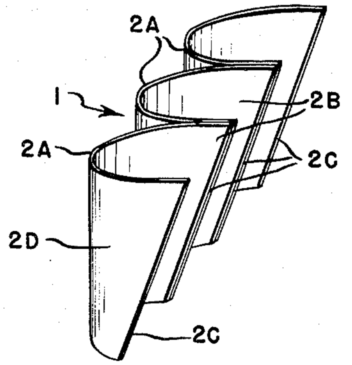
FIG. 8 is a diagrammatic perspective view of a part of a further modified form of the skirt structure shown in FIGS. 2 to 7.

FIG. 8 illustrates a skirt 1 in which the transverse extent of the skirt 1 varies with height. In this arrangement the outside surfaces 2D of the arcuate parts 2A are vertical while the inner edges 2C of the webs 2B are inclined so that they extend downwardly and outwardly, the webs 2B each effectively acting as a series of ties reinforcing the associated arcuate part 2A against outward deflection.

Figure 9:
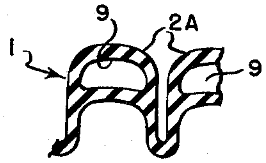
FIG. 9 is a broken horizontal sectional view diagrammatically showing an alternative form for the construction of the skirts shown in FIGS. 2 to 8.

FIG. 9 illustrates a form of skirt 1 in which the arcuate portions 2A are each associated with a vertically extending compartment 9 which is preferably closed top and bottom and pressurised, although it may not be pressurised. The dimensions of the section of the skirt of FIG. 9 may vary with the vertical distance below the underside of the vehicle body as in FIGS. 5, 6 or 8.

Figure 10:
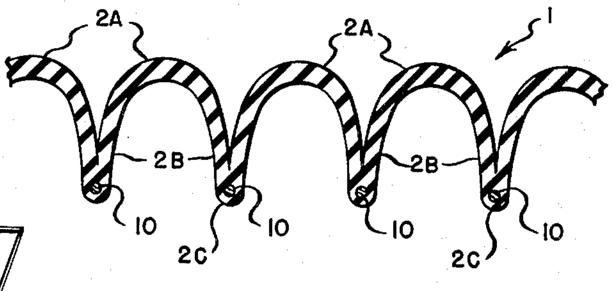
FIG. 10 is a horizontal sectional view similar to that of FIG. 7 illustrating a skirt structure provided with reinforcing means.

In the skirt 1 of FIG. 10 the innermost parts of the skirt, where adjacent webs 2B merge with each other, are provided with upright reinforcements 10 which may be, for example, a flexible cord, tape or wire. All the skirts mentioned herein may be reinforced as illustrated in FIG. 10.

Figure 11:
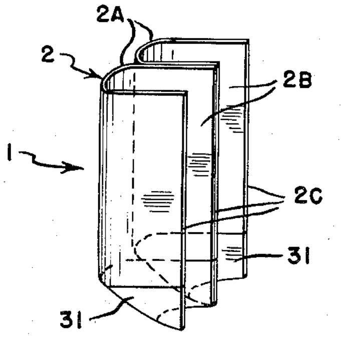
FIG. 11 is a diagrammatic perspective view of a part of a further modified form of skirt structure for use with air cushion borne vehicles.

The bottom portion of the corrugated skirt 1 may be inclined inwards towards the cushion as indicated at 31 in FIG. 11. This has the effect of minimizing the loss of air from the air cushion 3 beneath the bottom edge of the skirt 1.

Figure 12:
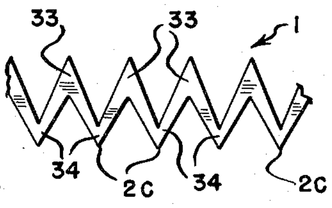
FIG. 12 is a diagrammatic plan view of a further modified form of corrugated skirt construction for use with air cushion borne vehicles.

FIG. 12 shows in plan view a different form of corrugated skirt that can be used for compartmenting the cushion 3. The skirt 1 in FIG. 12 is of zig-zag form. The thickness of the material of the zig-zag form of skirt 1 may vary with vertical distance from the underside of the vehicle body 15. In addition the thickness of the material in the zig-zag form of skirt 1 may vary within each corrugation, like that in FIG. 7, as indicated in FIG. 12 where the material is thicker at the locations 33 than it is at the locations 34. Skirts constructed as illustrated in FIG. 12 can be employed as the corrugated skirt which is secured to the peripheral part of the underside of the vehicle body 15, in which case the locations 33 would be on the outside of the skirt.

The vehicles mentioned above may be propelled by causing air to leave the craft in a rearward direction, the air for propulsion being in addition to the air loss in all horizontal directions to maintain the cushion 3. The air for propulsion may be directed backwards by employing mechanism that raises the rear part of the skirt 1, or by forming holes in this part of the skirt, or by providing ducts that convey air from the cushion 3 to rearwardly directed outlets. It will, of course, be understood that provision may be made in a similar manner for directing air sideways, or forwardly, to achieve sideways forces on the vehicle, or for braking the vehicle. Where holes or ducts are employed, devices are provided for controlling the flow of air through these holes or ducts thereby to control the propulsive, sideways, or braking forces on the vehicle.

It will be understood that all the above proposals can be applied both to vehicles that are adapted, in operation to be supported entirely by the air cushion 3 and to vehicles that are supported only partially by the air cushion. In the latter case the remainder of the weight is supported, for example, by tracks, wheels, planing surfaces, floating bodies, hydrofoils or aerofoils.

Figure 13:
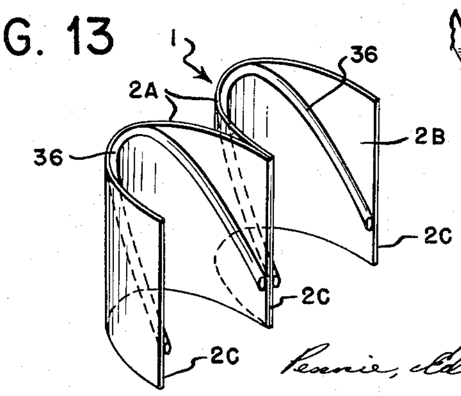
FIG. 13 is a diagrammatic perspective view of a portion of an alternative form of reinforced corrugated skirt construction.

In FIG. 13 there is illustrated a reinforced skirt 1 such reinforcement taking the form of a pipe-like member 36, which is preferably pressurised and which is secured to each corrugation. The disposition of this member 36 is such that a portion thereof is arranged to abut the underside of the vehicle body. Thus, cushion pressure acting outwardly on the corrugation is resisted by a compression load in the member 36 such load being supported by the vehicle body.

With the above-described skirts two inclinations thereof have been mentioned specifically, one downwardly and outwardly and the other downardly and inwardly with respect to the vehicle. It is to be noted that the skirts may be inclined downwardly in any direction, for example, downwardly and sideways with respect to the direction of the normal to the vehicle sides.

I claim:

1. An air cushion borne vehicle comprising a vehicle body, there being at least one opening on the underside of the vehicle body, a flexible skirt extending downwardly from the peripheral part of the vehicle body for encircling a space below the vehicle body, and means for forcing air through said opening into said space to form an air cushion that supports the vehicle, the skirt being of corrugated form in plan view, the outermost parts of the skirt being relatively resistant to buckling so far as compressive forces on these parts in the up and down direction are concerned, while the innermost parts of the skirt are relatively prone to buckling so far as compressive forces on these parts in the up and down direction are concerned.

2. A vehicle as claimed in claim 1, wherein the outer parts of the corrugations are arcuate in plan view with the concave surfaces thereof positioned for facing the air cushion.

3. A vehicle as claimed in claim 2, wherein two upright webs extend from opposite sides, one from each of said outer parts to project into the air cushion.

4. A vehicle as claimed in claim 3, wherein adjacent webs of adjacent corrugations are secured together.

5. A vehicle as claimed in claim 3, wherein the webs of each individual corrugation are not joined to the webs of adjacent corrugations.

6. A vehicle as claimed in claim 2, wherein each said outer part in plan view is semi-circular.

7. A vehicle as claimed in claim 1, wherein the thickness of the skirt decreases with increasing distance below the underside of the vehicle body.

8. A vehicle as claimed in claim 1, wherein the thickness of the skirt varies horizontally within each corrugation, the thickness being greatest centrally of said outer part.

9. A vehicle as claimed in claim 3, wherein the outside surfaces of the arcuate parts are vertical whilst the inner edges of the webs are inclined so that they extend downwardly and outwardly whereby the transverse extent of the skirt varies with height.

10. A vehicle as claimed in claim 1, wherein an inwardly directed lip is provided at the bottom edge of the skirt to impede escape of air from the cushion.

11. A vehicle as claimed in claim 1, wherein the outermost parts of the skirt have therein compartments which contain gas under pressure.

12. A vehicle as claimed in claim 1, wherein the innermost parts of the skirt are provided with upright reinforcements.

References Cited by the Examiner

UNITED STATES PATENTS

| | | | |
|---|---|---|---|
| 3,027,860 | 4/62 | Priest | 180—7 |
| 3,078,940 | 2/63 | Rolle | 180—7 |

FOREIGN PATENTS

| | | |
|---|---|---|
| 860,781 | 2/61 | Great Britain. |

MILTON BUCHLER, Primary, *Examiner.*

PHILIP ARNOLD, A. HARRY LEVY, *Examiners.*